Jan. 8, 1924.
J. THOMPSON
SUPPORT FOR GARDEN HOSE
Filed June 4, 1923
1,479,943
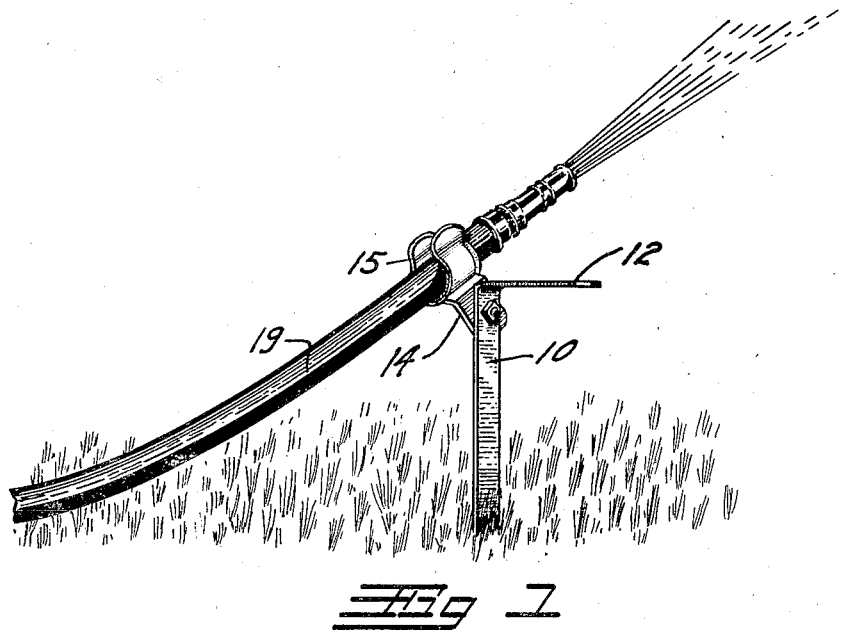
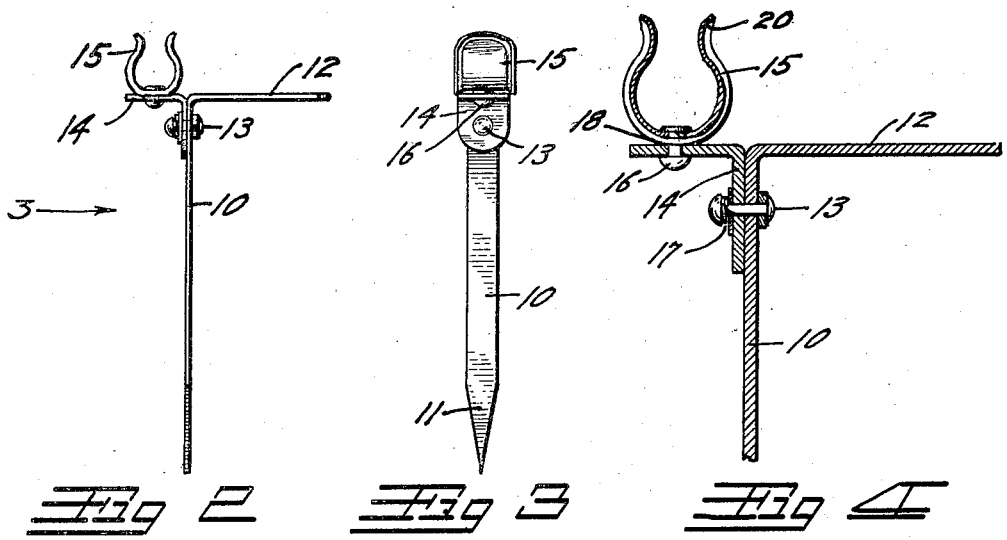
INVENTOR.
JAMES THOMPSON
BY
ATTORNEY.

Patented Jan. 8, 1924.

1,479,943

UNITED STATES PATENT OFFICE.

JAMES THOMPSON, OF GREELEY, COLORADO.

SUPPORT FOR GARDEN HOSE.

Application filed June 4, 1923. Serial No. 643,398.

*To all whom it may concern:*

Be it known that I, JAMES THOMPSON, a citizen of the United States of America, residing at Greeley, in the county of Weld and State of Colorado, have invented certain new and useful Improvements in Supports for Garden Hose, of which the following is a specification.

This invention relates to hose supports of the type adapted to support the nozzle end of a garden hose for irrigating purposes, and has for its principal object the provision of a cheap and efficient device of this character in which the angle of the nozzle can be directed in any desired direction without the necessity of changing or removing the entire hose support in the ground.

A further object of the invention is to provide means on a device of this character, which will act as a handle for forcing the support into, or removing same from the ground.

A still further object of the invention is to so construct the hose support, that it may be readily attached or detached from the hose without danger of injuring the same.

Other objects and advantages reside in the detailed construction of the invention, which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawings:

Fig. 1 is a perspective view of the invention in use.

Fig. 2 is a front elevation of the same.

Fig. 3 is a side elevation of the invention looking in the direction of the arrow 3 in Fig. 2.

Fig. 4 is a detail cross section of the upper portion of the improved hose supporter.

Let numeral 10 designate a vertical standard preferably rectangular in cross section. Standard 10 is pointed at its lower extremity as shown at 11 to facilitate its insertion in the ground, and is bent at right angles near its upper extremity to form a horizontal hand rest or handle 12. Pivoted to the standard 10 by means of a pivot bolt or rivet 13 is an angle clip 14. A hose clamp 15, stamped of spring metal is pivoted to the horizontal leg of the angle clip 14 by means of a pivot bolt or rivet 16.

Hose clamp 15 is free to revolve in any direction upon the clip 14, and the clip 14 may be revolved in any direction upon the standard 10.

In order to retain the various parts of the device in the desired position, a spring washer 17 is placed under the head of the pivot bolt 13 and serves to hold the angle clip 14 in constant frictional engagement with the standard 10. A similar spring washer 18 serves a like purpose with reference to the hose clamp 15 and the angle clip 14.

In use, the point 11 of the device is inserted in the ground. Should the ground be hard, the user can force the standard 10 into the ground by placing his foot upon the handle 12. The handle 12 also serves to facilitate the removal of the standard 10 from the ground.

The garden hose, designated by the numeral 19, is pressed into the hose clamp 15, which being constructed of spring material, will snugly engage the hose.

The hose 19 is then moved forward, back and sideways to direct the flow of the stream in any desired direction.

When it is desired to change the direction of the stream, it is only necessary to give the hose a pull which will revolve the various parts of the device without it being necessary to remove the standard 10 from the ground.

It will be noted that the edges of the hose clamp 15 are rolled back at all points, as indicated at 20, to prevent the clamp from injuring the hose in any manner.

While a specific form of the improvement has been described and illustrated herein, it is desired and understood that the same may be varied, within the scope of the appended claims, without departing from the spirit of the invention.

Having thus described the invention, what is claimed and desired to be secured by Letters Patent is:—

1. In a support for garden hose comprising a vertical standard, pointed at its lower extremity and turned at right angles near its upper extremity to form a handle the combination of an angle clip pivoted to the vertical leg of said vertical standard; a resilient hose clamp pivoted to the horizontal leg of said angle clip and spring means at both said pivoted points holding the pivoted parts in frictional engagement.

2. A hose support comprising in combination a vertical standard turned at right angles at its upper extremity and pointed at its lower extremity; an angular clip having a vertical and a horizontal leg pivoted to the vertical standard and held in frictional engagement therewith by spring means, the horizontal leg of said angular clip lying in the same plane as the turned upper extremity of said standard, and carrying pivoted thereon a hose clamp, and spring means for causing frictional engagement between said hose clamp and said horizontal leg.

In testimony whereof I affix my signature.

JAMES THOMPSON.